UNITED STATES PATENT OFFICE.

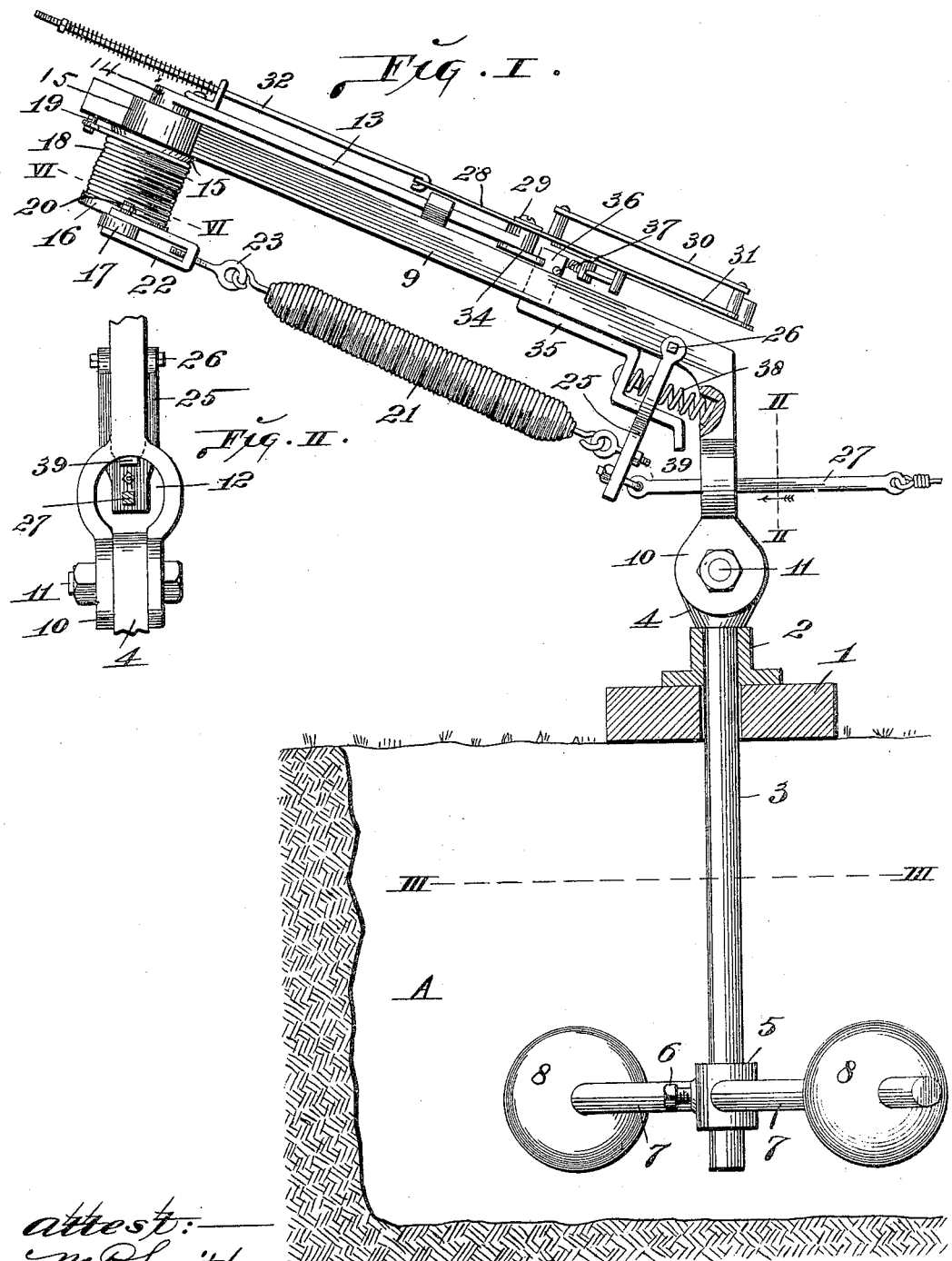

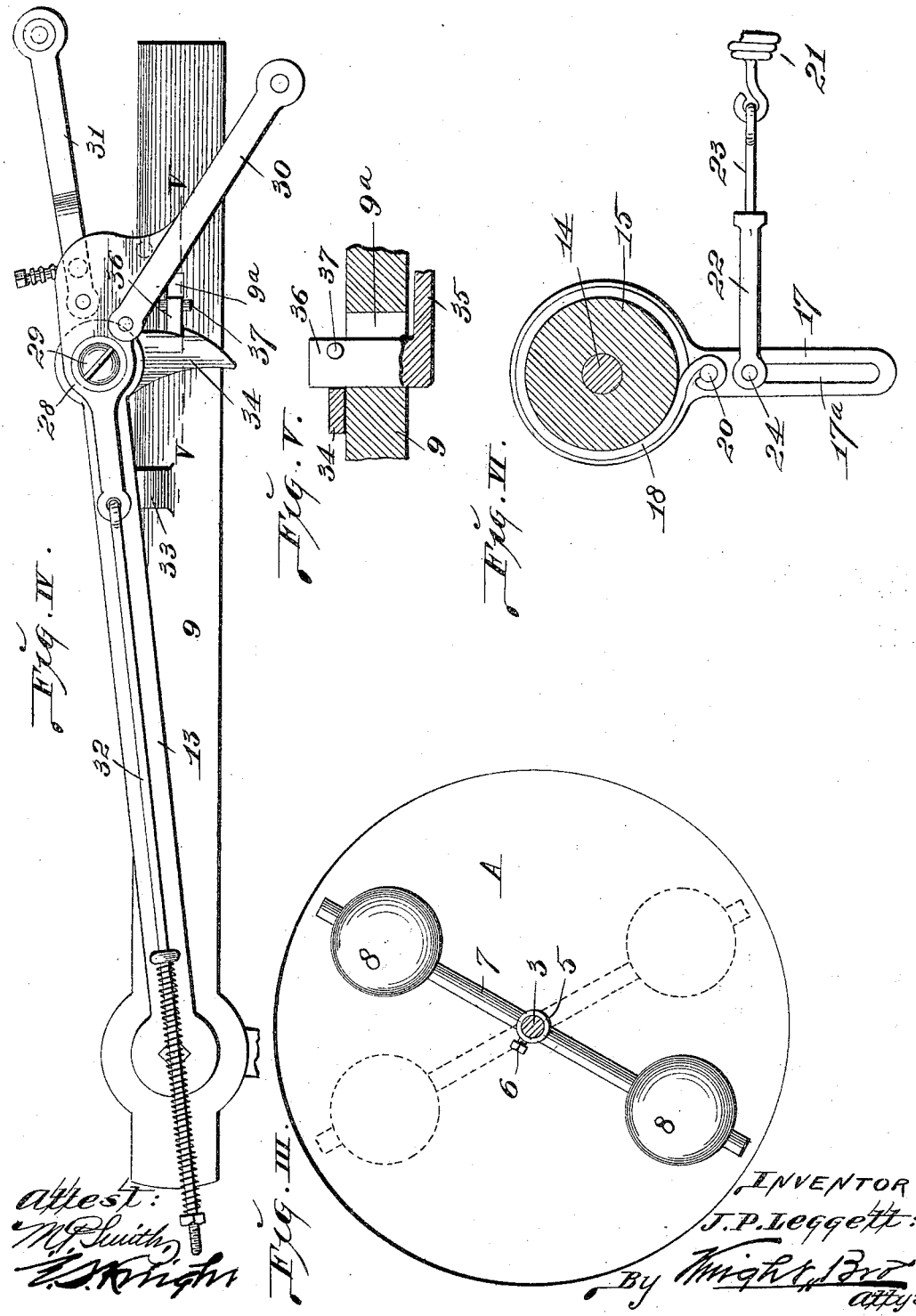

JOSEPH P. LEGGETT, OF CARTHAGE, MISSOURI, ASSIGNOR TO THE CHAMBERLIN CARTRIDGE & TARGET COMPANY, OF CLEVELAND, OHIO.

TARGET-TRAP.

No. 804,143.     Specification of Letters Patent.     Patented Nov. 7, 1905.

Continuation of application Serial No. 124,743, filed September 25, 1902. This application filed July 6, 1903. Serial No. 164,465.

*To all whom it may concern:*

Be it known that I, JOSEPH P. LEGGETT, a citizen of the United States, residing in Carthage, in the county of Jasper and State of Missouri, have invented certain new and useful Improvements in Target-Traps, of which the following is a full, clear, and exact description, reference being had to the accompanying drawings, forming part of this specification.

My invention relates to a trap for throwing disk targets, commonly known as "clay pigeons," and this application is filed as a substitute or a continuation of the application filed by me September 25, 1902, Serial No. 124,743.

The object of the invention is to provide a construction in which the trap throw-arm-actuating spring is normally inert, and means whereby said spring is put under tension and held under such tension until released by continued actuation of the operating parts of the trap.

A further object of the invention is to furnish a freely horizontally swinging frame for the trap.

Figure I is a side elevation of my trap. Fig. II is a view of a part of the trap-frame and spring pull-arm in elevation, with the pull-arm rod in section, taken on line II II, Fig. 1. Fig. III is a section taken on line III III, Fig. I, with the parts beneath said line shown in plan. Fig. IV is a top view of the trap-frame throw-arm, target-receiving jaws, and latch. Fig. V is an enlarged section taken on line V V, Fig. IV. Fig. VI is a horizontal section taken on line VI VI, Fig. I.

In mounting my trap I produce a pit, such as A, Fig. I, across which is positioned a base 1, by which the trap is rotatively supported for horizontal swinging movement. On the base 1 is a collar 2, and in this collar is loosely positioned a vertical pivot-stem 3, that is provided at its upper end with a swivel-head 4. Fixed to the pivot-stem 3, preferably near its lower end, is a collar 5, that is held to the stem by a set-screw 6, so as to be adjustable vertically on the stem. Secured to this collar are arms 7, that extend outwardly therefrom and bear weights 8, that serve to counterbalance the pivot-stem. The arms 7 are adapted to receive the feet of the trap-operator, who is seated at the location of the pit and who by pressure of the feet against said arms swings them horizontally within the pit to rotate the pivot-stem and swing the trap-frame horizontally in the manner fully described in my application hereinbefore referred to.

9 designates the frame of the trap, the lower end of which is provided with a head 10, that is pivoted to the pivot-stem 3 by a bolt 11, so that said frame may be swung vertically with respect to the pivot-stem to acquire any desired inclination thereof. The upright portion of the frame 9 is provided with an aperture 12, extending therethrough, as seen in Fig. II.

13 designates a throw-arm that is fixed to a rock-shaft 14, extending through a hub 15, carried by the free end of the frame 9. Upon the lower end of the rock-shaft 14 is a disk 16, that carries a crank-arm 17, which contains a longitudinal slot $17^a$. Surrounding the hub 15 is a coil-spring 18, one end of which is connected at 19 to the trap-frame and the other end of which is connected at 20 to the crank-arm 17. The spring 18 serves as a retractive spring to return the throw-arm 13 of the trap after it has been actuated in the act of throwing a target.

21 designates a throw-spring one end of which is connected to the crank-arm 17 by suitable means, such as a stirrup 22 and a screw-eye 23. The stirrup 22 contains a slide-pin 24, that operates in the slot $17^a$ of the crank-arm 17, as seen in Fig. VI. The opposite end of the throw-spring is connected to a pull-arm 25, that is pivoted at 26 to the frame 9. (See Figs. I and II.) The pull-arm 25 receives the connection of a pull-rod 27, that may be actuated by any suitable means.

28 designates a target-carrier that is pivoted at 29 to the throw-arm 13 and carries the target-supporting jaws 30 and 31. The rocker 28 is held in alinement with the throw-arm 13 by a spring-controlled rod 32, mounted on said throw-arm.

33 is a stop that limits the return movement of the throw-arm 13 when it is actuated by the retractive spring 18.

34 designates a latch-arm that is carried by the throw-arm 13 and which when the throw-arm is returned to the stop 33 occupies a position across the frame 9, as seen in Figs. I and IV.

35 designates a trigger reciprocatingly positioned beneath the frame 9 and having an upwardly-extending arm 36, that is adapted to receive the engagement of the latch-arm 34. The trigger-arm 36 is supported by studs 37, that rest upon the frame 9. The trigger-arm 36 operates through a slot 9ª in the frame 9, and it is normally held projected into the path of travel of the latch-arm 34 by a spring 38, that occupies a position between the trigger 35 and the upright portion of the frame 9, as seen in Fig. I. The forward lower portion of the trigger 35 passes loosely through the pull-arm 25, and it has a downturned lip 39, that is adapted to be engaged by said pull-arm when the arm is drawn forwardly to put the throw-spring 21 under tension.

In the use of my trap constructed as herein described the entire trap may be oscillated horizontally by the operator through the medium of the arms 7, projecting from the pivot-stem 3, by said operator placing his feet upon said arms to accomplish such movement. Assuming the parts to be in the positions shown in the drawings, the operation of the trap is as follows: When the parts are set as illustrated, the throw-spring 21 is inert and the throw-arm, which is in what may be called the "active" position, is held from movement by the trigger-arm 36. The target is then placed upon the carrier carried by the throw-arm, and the trap is ready to be thrown. By a pull upon the rod 27 the pull-arm 25 is swung forwardly, thereby putting the throw-spring 21 under tension to actuate the throw-arm 13 through the medium of the rock-shaft 14. As the throw-spring is expanded the pull-arm 25 is moved to the downwardly-projecting trigger-lip 39, thereby reciprocating the trigger 35 and withdrawing the trigger-arm 36 from engagement with the latch-arm 34, thereby permitting exertion of the strength of the expanded throw-spring to be expended to actuate the throw-arm. Then upon the release of the throw-spring by discontinuing the pull thereupon it relaxes and becomes inert, and the retractive spring 18 acts upon the throw-arm reversely to return it to its active position, so that the latch-arm 34 will be engaged by the trigger-arm and held ready for the throwing of the next target.

I claim as my invention—

1. In a target-trap, the combination of a swinging throw-arm, a throwing-spring which is operatively connected with said throw-arm and is, normally, substantially inert when the throw-arm is in its active position, with a single pulling means for imparting tension to said spring and for releasing the throw-arm to the action thereof.

2. In a target-trap, the combination of a swinging throw-arm, a throwing-spring operatively connected therewith, and, normally, substantially inert when the throw-arm is in its active position, a trigger and a single pulling means extensible an indefinite distance from the trap and adapted by its movement in one direction to first put tension on the spring and then to withdraw said trigger.

3. In a target-trap, the combination with a frame and a swinging throw-arm mounted thereon, with a throwing-spring operatively connected with said throw-arm, and, normally, substantially inert when the throw-arm is in its active position, means restraining the throwing movement of said arm, and means, independent of the throw-arm, for putting tension on the throwing-spring, and for withdrawing said restraining means after the spring is under tension.

4. In a target-trap, the combination with a frame, and a swinging throw-arm mounted thereon, of a throwing-spring which is operatively connected with said throw-arm, and is, normally, substantially inert when the throw-arm is in its active position, a spring-actuated trigger restraining the throwing movement of said throw-arm, a pull-rod connected with the spring and adapted to put it under tension, and means whereby said pull-rod, after putting the throwing-spring under tension, releases the trigger.

5. In a target-trap, the combination with a frame, and a swinging throw-arm mounted thereon, of a throwing-spring which is operatively connected to said throw-arm and is normally, substantially inert when the throw-arm is in the active position, means retaining said throw-arm in the active position, means for imparting tension to said spring, means for freeing said throw-arm after tension in said spring is secured, and a retracting-spring engaging with the throw-arm and exerting its force to return it to its active position when the tension is off the throwing-spring.

6. In a target-trap, the combination of a frame, an approximately vertical shaft mounted in said frame and having a crank-arm, a throw-arm fast upon said shaft, a retracting-spring embracing said shaft and connected with it and with the frame, a trigger for engaging with said throw-arm, a normally inert coiled spring secured at one end to said crank-arm, means, connected with the other end, for putting the spring under tension and for withdrawing said trigger.

7. In a target-trap, the combination of a throw-arm and means for operating the same, with a frame which supports said throw-arm and operating mechanism, a base upon which said frame is mounted upon a vertical axis, with unrestrained freedom of motion about said axis, and a lever-arm projecting laterally from said frame and capable of being used by an operator at the trap to control the position of said frame relative to the base.

8. In a target-trap, the combination of a throw-arm, and means for operating the same, with a frame on which said throw-arm is mounted, a base in which the frame is mounted on a vertical axis with unrestrained freedom of horizontal swinging movement, and a pair of laterally-offset counterbalances carried by said frame.

9. In a target-trap, the combination of a frame, freely movable about a vertical axis, a swinging throw-arm mounted on said frame, means restraining the throw-arm from moving from its active position, a throwing-spring which is operatively connected with said throw-arm, and is, normally, substantially inert when the throw-arm is in its active position, and a pulling device operable from a distance, for imparting tension to said throwing-spring, and for withdrawing said restraining means after the tension has been imparted to said spring.

10. In a target-trap, the combination of a throw-arm, and means for operating the same, with a frame on which said throw-arm is mounted, a base in which the frame is mounted on a vertical axis with unrestrained freedom of horizontal swinging movement, and a pair of laterally-offset arms carried by said axis.

11. The combination in a target-trap, of a throwing-arm, a propelling-spring normally inactive when the arm is in loading position and means whereby the spring may be placed under tension and the throwing-arm released by the stress which renders the spring active.

JOSEPH P. LEGGETT.

In presence of—
E. S. KNIGHT,
NELLIE V. ALEXANDER.